United States Patent
Sloane

(10) Patent No.: US 7,650,747 B2
(45) Date of Patent: Jan. 26, 2010

(54) METHOD AND APPARATUS FOR EXHAUST GAS PURIFYING USING HYDROCARBON-SELECTIVE CATALYTIC REDUCTION

(75) Inventor: Thompson M. Sloane, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 350 days.

(21) Appl. No.: 11/692,463

(22) Filed: Mar. 28, 2007

(65) Prior Publication Data
US 2008/0236142 A1    Oct. 2, 2008

(51) Int. Cl.
  *F01N 3/00* (2006.01)
(52) U.S. Cl. .............................. 60/286; 60/274; 60/295; 60/297; 60/301; 48/197 R; 44/359; 44/366
(58) Field of Classification Search ................ 60/274, 60/285, 286, 295, 297, 301, 303; 48/197 R; 44/358, 359, 366
  See application file for complete search history.

(56) References Cited

U.S. PATENT DOCUMENTS

| | | | |
|---|---|---|---|
| 2,763,537 | A | 9/1956 | Barusch et al. |
| 5,482,518 | A | 1/1996 | Poirier |
| 5,758,496 | A * | 6/1998 | Rao et al. ............... 60/295 |
| 6,532,736 | B2 | 3/2003 | Hammerle et al. |
| 6,708,484 | B2 | 3/2004 | Onodera et al. |
| 6,792,751 | B2 | 9/2004 | Kokusyo et al. |
| 6,843,208 | B2 | 1/2005 | Tamura et al. |
| 6,892,531 | B2 * | 5/2005 | Rim ....................... 60/295 |
| 6,928,806 | B2 * | 8/2005 | Tennison et al. .......... 60/286 |
| 7,000,382 | B2 * | 2/2006 | Lee et al. ................ 60/286 |
| 7,063,642 | B1 * | 6/2006 | Hu et al. ................ 477/100 |
| 7,082,753 | B2 | 8/2006 | Dalla Betta et al. |
| 7,412,823 | B2 * | 8/2008 | Reuter et al. ............ 60/295 |
| 7,434,387 | B2 * | 10/2008 | Yan ...................... 60/286 |
| 7,469,693 | B2 * | 12/2008 | Graves et al. ........... 123/673 |
| 2002/0054844 | A1 | 5/2002 | Pfeifer et al. |

(Continued)

FOREIGN PATENT DOCUMENTS

DE    198 59 201 A1    6/2000

(Continued)

OTHER PUBLICATIONS

Kass,M; Selective Catalytic Reduction of Diesel NOx Emissions using Ethanol as a Reductant; USDOE 9th DEER Conf; Aug. 2003; Newport RI USA.

(Continued)

*Primary Examiner*—Binh Q Tran

(57) ABSTRACT

There is provided a method and apparatus for exhaust gas purifying, especially $NO_x$ reduction. The apparatus comprises an internal combustion engine adapted to operate primarily lean of stoichiometry. There is an aftertreatment system that is fluidly connected to and adapted to treat exhaust gas flowing from the internal combustion engine. The aftertreatment system comprises a hydrocarbon-selective catalytic reduction device. There is an injector device adapted to inject a blend of fuel and an ignition improver into the exhaust gas at a location upstream of the hydrocarbon-selective catalytic reduction device. A control module is adapted to control the injector device to inject the blended fuel and cetane-enhancer into the exhaust gas when temperature of the exhaust gas at the location of the injection is greater than about 280° C.

18 Claims, 2 Drawing Sheets

U.S. PATENT DOCUMENTS

2004/0083721 A1    5/2004    Ketcher et al.
2004/0083722 A1    5/2004    Simpson et al.
2006/0201468 A1    9/2006    Lancaster et al.

FOREIGN PATENT DOCUMENTS

EP           0 605 237 A    7/1994

OTHER PUBLICATIONS

Twigg, M; Automotive Exhaust Emissions Control; Platinum Metals Rev, 2003, 47,(4),157-162.

Lee, JH; HC Reaction pathway in Selective NO reduction over a bifunctional $SnO_2/Al_2O_3$ Catalyst; Chem Commun. 2001, 1404-1405; Royal Soc. of Chem, UK.

Takahashi, et al. HC-SCR Catalyst Development fro Reducing Tail Pipe NOx Emissions; Engine Technology Progress in Japan; Inter-Techn Energy Progress, Inc., San Antonio, TX, USA 2004.

\* cited by examiner

METHOD AND APPARATUS FOR EXHAUST GAS PURIFYING USING HYDROCARBON-SELECTIVE CATALYTIC REDUCTION

TECHNICAL FIELD

This invention pertains generally to internal combustion engines and exhaust aftertreatment.

BACKGROUND OF THE INVENTION

The statements in this section merely provide background information related to the present disclosure and may not constitute prior art.

Manufacturers of internal combustion engines are continually developing new engine control strategies to satisfy customer demands and meet various regulations. One such engine control strategy comprises operating an engine at an air/fuel ratio that is lean of stoichiometry to improve fuel economy and reduce greenhouse gas emissions. Such engines include both compression-ignition (diesel) and lean-burn spark-ignition engines. When an engine operates in a region lean of stoichiometry, combustion temperatures typically increase, leading to increased $NO_x$ emissions. One proposed type exhaust aftertreatment system and control strategy for managing and reducing $NO_x$ emissions includes injection of a reductant into an exhaust gas feedstream upstream of a hydrocarbon-selective catalytic reduction ('HC-SCR') catalytic device to cause a reduction of $NO_x$ exhaust gases to nitrogen and oxygen across the HC-SCR device, among other gases.

Currently, proposed systems for injecting reductants for selective catalyst reduction of $NO_x$ require additional hardware and control schemes to accomplish such operation. An example of such a system includes injection of engine fuel into the exhaust stream. The effectiveness of this method decreases significantly at an exhaust temperature below 400° C. at the point of injection, and requires an adequate residence time of the reductant in the exhaust feedstream. Another example includes injection of ammonia into the exhaust feedstream upstream of a reduction catalyst. There are infrastructure-related problems associated with storage, transport, and handling of ammonia for a large fleet. Furthermore, un-reacted ammonia may pass through the SCR and be exhausted into the atmosphere. Another example comprises use of urea as a reductant for selective catalytic reduction. Such a system requires replenishing urea on-board the vehicle, which requires an infrastructure to distribute the urea. Furthermore, the freezing point of the urea solution is −12° C., presenting a problem for its use in cold climates. Another example comprises use of $NO_x$ storage catalysts. These catalysts can be effective, but they typically require a large catalyst volume and a substantial mass of expensive platinum-group metals (e.g., Pt, Pd, and Rh) in combination with extremely low sulfur fuel and periodic intrusive operation of the engine to regenerate the catalyst, thus reducing the effective fuel economy of the vehicle.

Hydrocarbon-selective catalytic reduction (HC-SCR) is a technology for reducing emissions of nitrogen oxides in lean exhaust, such as diesel exhaust. One of the significant challenges of implementing HC-SCR is to develop a system that allows sufficient reduction of $NO_x$ emissions over the range of exhaust temperatures found in diesel engines at the speeds and loads experienced during typical, every-day operation. Furthermore, it is desirable that the hydrocarbon reductant be present on the vehicle. One source of reductant is the exhaust itself, but typical hydrocarbons present in engine exhaust are generally less active than diesel fuel. The use of diesel fuel and selected diesel fuel-component hydrocarbons as the reductant has been explored by several investigators. Results indicate that the $NO_x$ reduction efficiency of HC-SCR catalysts can be greatly improved if appropriate active hydrocarbon species are used. The most effective active species appear to be oxygenated hydrocarbons, such as acetaldehyde and formaldehyde. These oxygenated species are produced by low-temperature oxidation of long, straight-chain alkane hydrocarbons of the type that are present in diesel fuel. Also, long, straight-chain alkenes are produced by low-temperature oxidation of these same alkanes, and have been found to be more effective reductants than the long, straight-chain alkanes in some studies.

A system that results in adequate reduction of $NO_x$ emissions over a range of exhaust temperatures typically found in diesel engines at the speeds and loads experienced in everyday driving, i.e., 200° C.-500° C., is desirable. A number of hydrocarbons have been shown to be effective for the reduction of $NO_x$ over silver-alumina ($Ag/Al_2O_3$) and barium-yttria (BaY) zeolite catalysts, including long straight-chain alkane hydrocarbons, alkene hydrocarbons, and diesel fuel, as well as alcohols and aldehydes.

Hydrocarbons present in diesel and gasoline engine exhaust such as methane, ethane, propene, and propane require high temperatures for adequate $NO_x$ conversion, and are generally not suitable for HC-SCR. Long straight-chain alkane hydrocarbons such as n-octane and n-decane that are present in diesel fuel require somewhat lower temperatures for adequate $NO_x$ conversion compared to the lighter hydrocarbons. This observation has led to the use of diesel fuel and long straight-chain alkane hydrocarbons as the $NO_x$ reductant in a number of studies. These studies have shown, however, that diesel fuel as well as long, straight-chain hydrocarbons are only adequate above a catalyst temperature of about 300° C. (573 K) and low catalyst space velocity. Further work has shown that alcohols and aldehydes can reduce $NO_x$ at catalyst temperatures as low as 200 to 250° C. (473 K to 523 K). Long, straight-chain alkene hydrocarbons have been found to be effective at temperatures as low as 250 to 300° C. (523 K to 573 K). However, these species are not readily available in engine exhaust streams. A method for producing these species on-board the vehicle that leads to efficient selective reduction of $NO_x$ over the entire desired exhaust temperature range is desireable.

It has been reported that the peak temperature for $NO_x$ conversion using diesel fuel can be reduced by injecting the diesel fuel into a region upstream of the catalyst that has been preheated to 400° C. (673 K) while maintaining a lower catalyst temperature. Peak $NO_x$ conversion efficiencies have been obtained at catalyst temperatures near 300° C. (573 K) with this method. It was believed that the diesel fuel was partially oxidized at 400° C. (673 K) to form species that were more effective for HC-SCR than diesel fuel by itself. The drawback to this method, however, is that supplemental heating of the exhaust may not be suitable for practical engine exhaust systems on a vehicle. Ignition improvers, when added to diesel fuel, have been shown to lower the autoignition temperature by lowering the temperature where diesel fuel oxidation begins to take place. A method to take advantage of this lower oxidation temperature to prepare partial oxidation products for use in exhaust HC-SCR can be useful.

Specific lean-operating engine configurations may employ oxidation catalytic devices immediately downstream of the engine to manage exhaust emissions related to hydrocarbons and particulate matter, and accommodate fuel sulfur. An oxidation catalyst readily oxidizes aldehydes. Any aldehydes produced in engine in-cylinder burning are oxidized in the oxidation catalyst and are unavailable for $NO_x$ reduction in an HC-SCR device.

Thus, there is a need for a method and system to facilitate hydrocarbon-selective reduction of exhaust gas $NO_x$ in an aftertreatment system for an engine operating lean of stoichiometry wherein the aftertreatment system includes an oxidation or other catalytic device upstream of the HC-SCR device, while addressing issues related thereto.

SUMMARY OF THE INVENTION

In accordance with an embodiment of the invention, a method and apparatus for $NO_x$ reduction are provided, which address the aforementioned need, comprising an exhaust gas purifying system. The system includes a hydrocarbon-selective catalytic reduction device, adapted to treat exhaust gas flowing from an internal combustion engine. There is an injector device adapted to inject a blend of fuel and an ignition improver into the exhaust gas at a location upstream of the hydrocarbon-selective catalytic reduction catalyst. A control module is adapted to control the injector device to inject a quantity of the blended fuel and ignition improver into the exhaust gas when temperature of the exhaust gas at the location of the injection is greater than about 280° C.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
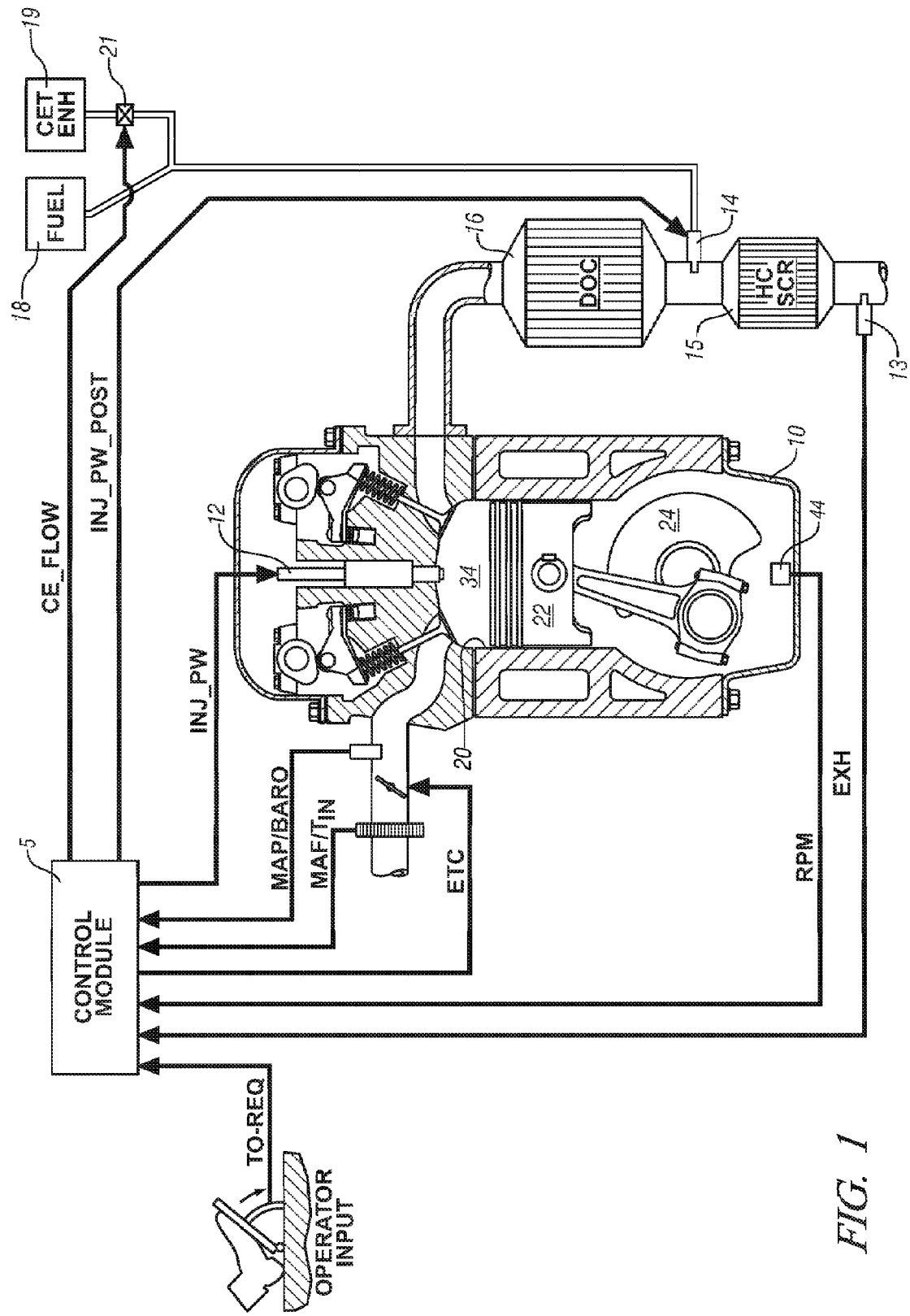
FIG. 1 is a schematic diagram of a powertrain system, in accordance with the present invention; and, FIG. 2 is a datagraph, in accordance with the present invention.

Referring now to the drawings, wherein the showings are for the purpose of illustrating the invention only and not for the purpose of limiting the same, FIG. 1 comprises a schematic diagram depicting an internal combustion engine 10, exhaust aftertreatment system, and control system which are in accordance with an embodiment of the present invention.

The exemplary engine 10 comprises a direct-injection, compression-ignition, internal combustion engine employing a four-stroke operation wherein each engine combustion cycle comprises 720 degrees of angular rotation of a crankshaft 24 divided into four 180-degree stages of intake-compression-expansion-exhaust, which are descriptive of reciprocating movement of pistons 22 in each engine cylinder 20, which form a variable volume combustion chamber with the engine head. The engine preferably has an operating regime that is primarily lean of stoichiometry. The skilled practitioner understands that the invention is applicable to other engine configurations that operate primarily lean of stoichiometry, e.g., homogeneous-charge compression-ignition engines, lean-burn spark-ignition engines, and two-stroke engine configurations. The reciprocating pistons are attached to the crankshaft 24, which is operably attached to a vehicle transmission and driveline to transmit tractive torque thereto. During ongoing operation of the compression-ignition engine, a combustion event occurs during each engine cycle when fuel is injected into the combustion chamber 34 during the compression stroke, leading to ignition of the injected fuel. In-cylinder burned gases are generated due to incomplete combustion of the fuel and air mixture, which become exhaust gases when passed out of the combustion chamber with opening of the engine exhaust valves. The exhaust gas is made up of regulated constituent elements preferably transformed by the aftertreatment system to inert gases, typically including hydrocarbons ('HC'), carbon monoxide ('CO'), nitrogen oxides ('NOx'), and particulate matter ('PM'), among others. The engine includes sensing devices to monitor engine operation, and actuators which control engine operation. The sensing devices and actuators are signally and operatively connected to control module 5.

The sensing devices are installed on or near the engine to monitor physical characteristics and generate signals which are correlatable to engine and ambient parameters. The sensing devices preferably comprise a crank sensor 44 for monitoring crankshaft speed (RPM), a manifold pressure sensor for monitoring manifold pressure (MAP) and ambient pressure (BARO), a mass air flow sensor for monitoring intake mass air flow (MAF) and intake air temperature ($T_{IN}$), and, an exhaust gas sensor 13 for monitoring states of one or more exhaust gas parameters, e.g., temperature, air/fuel ratio, and constituents (EXH). The exhaust gas sensor is depicted downstream of the exhaust aftertreatment system. One skilled in the art understands that there can be one or more sensing devices and methods for monitoring exhaust gas before, in the middle of, and after the exhaust aftertreatment system for purposes of control and diagnostics. Operator input, in the form of an operator torque request ($TO\_REQ$) is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable within functionally equivalent devices and algorithms and still fall within the scope of the invention.

The actuators are installed on the engine and in the aftertreatment system, and are controlled by the control module 5 in response to operator inputs to achieve various performance goals. Actuators include an electronically-controlled throttle device which controls throttle opening to a commanded input (ETC), and a fuel injector 12 adapted to directly inject fuel into each of the combustion chambers in response to a commanded input (INJ_PW), all of which are controlled in response to the operator torque request ($TO\_REQ$). Other engine system components (not shown) may include an intake air compressing device, e.g., a variable geometry turbine device and air compressor, a charge air cooler, an exhaust gas recirculation (EGR) valve and cooler, and, intake/exhaust valve control and management systems, among others.

In the embodiment, the system includes a second injector device 14 mechanized and adapted to inject a mixture of the fuel and ignition improver into an exhaust pipe upstream of a HC-SCR device 15, and is controlled by a signal (INJ_PW_POST) output from the control module, which is adapted to control timing and quantity of the injection. There is a fuel tank 18 and a tank or other storage device 19 containing the ignition improver. The fuel and the ignition improver are blended, and the mixture is injected using the second injector device 14. The second injector device 14 preferably comprises a solenoid-actuated fuel injector that has been adapted to inject the blended fuel and ignition improver into the exhaust system. The system is mechanized to include a flow control valve 21 for metering flow of the ignition improver to the injector 14. Operation of the flow control valve 21 is controlled by the control module. The control module generates a control signal, CE_FLOW, to control operation of the flow control valve 21 to achieve a preferred blend of the fuel and the ignition improver, depending upon operating conditions, most notably temperature at the location of the injection of the blended fuel and ignition improver, and engine operating conditions. As depicted with reference to FIG. 2, when exhaust gas temperature is above about 430° C. at the location of the injection, the fuel may oxidize on its own to generate sufficient quantities of oxygenated hydrocarbon reductants, e.g., acetaldehydes, in the exhaust gas feedstream upstream of the HC-SCR catalytic device 15. Thus, there may be limited need for the blended fuel and ignition improver at or above that operating temperature, and therefore the flow control valve 21 is preferably shut off to eliminate flow of the ignition improver.

Mass flowrate of the mixture of fuel and ignition improver into the exhaust gas feedstream upstream of the HC-SCR device 15 is determined based upon the engine operating conditions and the space velocity of the HC-SCR device 15. The engine operating conditions specifically include those which can be used to determine mass of $NO_x$ emissions flowing out of the engine. The mass flowrate of $NO_x$ emissions can be determined by monitoring operating states of the various engine parameters, including engine speed, mass airflow rate, recirculated exhaust gas flow, and fuel flowrate, from which a skilled practitioner is able to estimate or measure engine air/fuel ratio and mass flow rate of $NO_x$ emissions. A direct measurement of $NO_x$ in the exhaust can also be accomplished with an appropriate $NO_x$ sensor. The mass flowrate of the mixture of fuel and ignition improver into the exhaust system is controlled by controlling timing and duty cycle of the injector pulsewidth (INJ_PW_POST) to partially oxidize the fuel to produce a sufficient quantity of active species of hydrocarbons. These active species flow across the hydrocarbon-selective catalytic reduction (HC-SCR) catalyst to reduce $NO_x$ molecules to nitrogen and other inert gases at a lower catalyst temperature than is possible with un-oxidized diesel fuel, in the presence of the catalysts.

The exhaust aftertreatment system comprises an integrated system for converting the constituent elements of the exhaust gas to inert gases. The exhaust aftertreatment system is preferably constructed of a plurality of devices which employ technologies having various capabilities for treating the constituent elements of the exhaust gas of the engine, including, e.g., selective catalyst reduction, oxidation, and particulate filtering. The devices are preferably fluidly connected in series using known pipes and connectors. The exhaust manifold entrains and directs exhaust gas flow to the exhaust aftertreatment system. The aftertreatment system as depicted comprises an oxidation catalytic device ('DOC') 16 and the hydrocarbon-selective catalyst reduction ('HC-SCR') device 15.

The oxidation catalytic device 16 as depicted includes a platinum-group metal catalyst supported on an alumina washcoat that has been impregnated onto a ceramic honeycomb-structure substrate that has been assembled into a metal can device having a flow inlet and a flow outlet, although the invention is not so limited.

The hydrocarbon-selective catalyst reduction ('HC-SCR') device 15 is fluidly connected to the oxidation catalyst 16 to receive exhaust gas flowing therefrom, and flow the exhaust gas therethrough. Exemplary HC-SCR catalysts include alumina catalysts, silver-alumina ($Ag/Al_2O_3$) catalysts, and barium- and sodium-yttria zeolite catalysts. The selected HC-SCR catalyst is incorporated into a suitable washcoat and impregnated upon a ceramic or metal substrate having flow-through characteristics, e.g., a honeycomb configuration. The impregnated substrate is assembled into a stainless steel metal assembly having an inlet and an outlet, to form the HC-SCR device. The HC-SCR device has physical characteristics including size, volume, space velocity and flow restriction appropriate to the specific engine and vehicle to which it is applied. Other devices of the exhaust aftertreatment system 15 may comprise, e.g., a diesel particulate filter device ('DPF'), determined accordingly during vehicle development, and placed downstream of the HC-SCR device.

The control module 5 is preferably an element of a distributed control system comprising a plurality of control modules adapted to provide coordinated control of the various vehicle systems including the powertrain system described herein. The control module is operable to monitor inputs from sensing devices, synthesize pertinent information, and execute algorithms to control various actuators to achieve control targets, including such parameters as fuel economy, emissions, performance, driveability, and protection of hardware. The control module is operably connected, either directly or through the control system, to a plurality of other devices through which a vehicle operator typically controls or directs operation of the vehicle and powertrain. Exemplary devices through which the vehicle operator controls or directs the operation of the powertrain include the throttle and brake pedals, a transmission gear selector, and, vehicle speed cruise control.

The control module 5 comprises a central processing unit signally electrically connected to volatile and non-volatile memory devices via data buses. The control module is preferably a general-purpose digital computer generally comprising a microprocessor or central processing unit, storage mediums comprising random access memory (RAM), non-volatile memory devices including read only memory (ROM) and electrically programmable read only memory (EPROM), high speed clock, analog to digital (A/D) and digital to analog (D/A) circuitry, and input/output circuitry and devices (I/O) and appropriate signal conditioning and buffer circuitry. Control algorithms, comprising resident program instructions and calibrations, are stored in the non-volatile memory devices and executed to provide the respective functions. Algorithms are typically executed during preset loop cycles such that each algorithm is executed at least once each loop cycle. Algorithms are executed by one of the central processing units to monitor inputs from the sensing devices and execute control and diagnostic routines to control operation of the respective device. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The invention comprises a method, preferably executed as one or more algorithms in the control module to generate an active species, including oxygenated hydrocarbon and straight-chain alkene hydrocarbon reductants, in the exhaust gas feedstream of the engine 10 upstream of the HC-SCR device and after any intervening catalytic device such as the aforementioned oxidation catalytic device. The method comprises injecting the hydrocarbon-based fuel mixed with ignition improver into the exhaust gas feedstream such that temperature of the exhaust gas at the location of whereat the fuel is being injected is in a range of temperatures from about 280°

C. to about 430° C. at the start of the injection. The temperature of the exhaust gas can be directly measured using a temperature monitoring device (not shown), or inferred based upon a predetermined calibration generated during engine development and stored in non-volatile memory in the control module.

Figure 2:
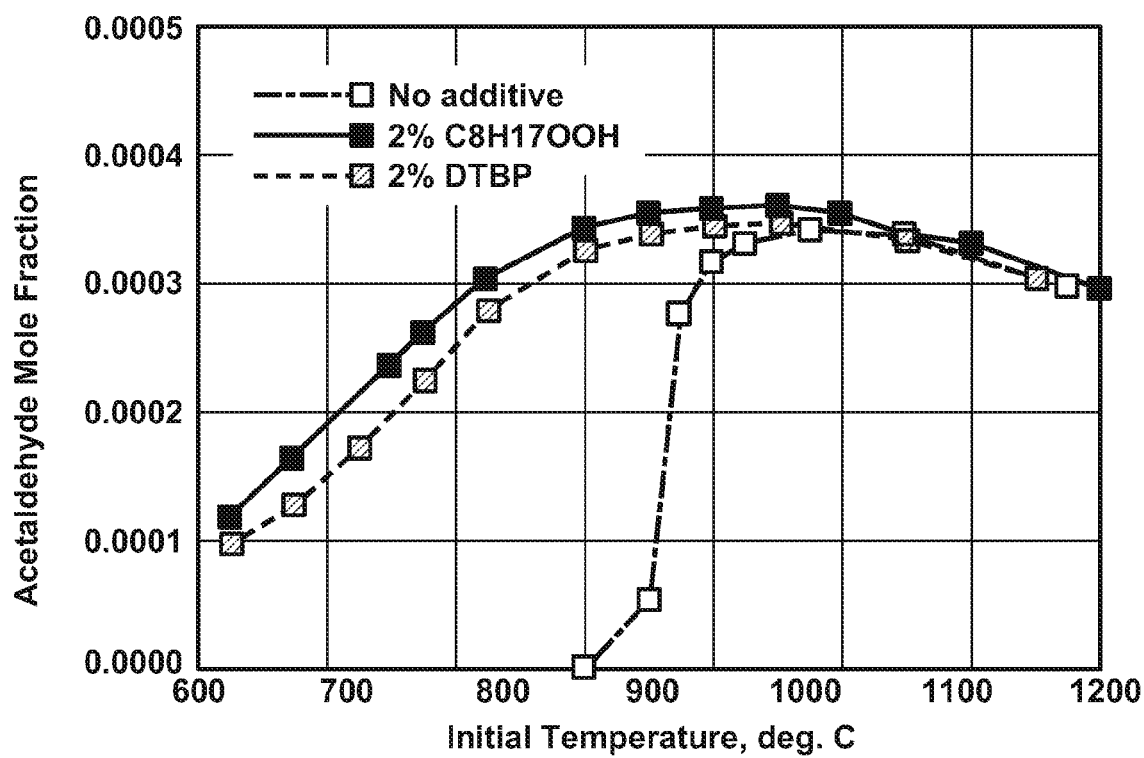

Referring now to FIG. 2, results depicting production of acetaldehyde based upon temperature at a point of injection are depicted for diesel fuel (modeled as n-heptane), and diesel fuel with a small quantity of ignition improver, e.g., a cetane-enhancer, added. These results demonstrate that acetaldehydes, useable for $NO_x$ reduction across the HC-SCR device, are formed at lower temperatures with the addition of the cetane-enhancers of di-t-butylperoxide (2% DTBP) and octylhydroperoxide (2% $C_8H_{17}OOH$), compared to diesel fuel with no additives. The temperature required to initiate sufficient low-temperature oxidation is significantly decreased by mixing diesel fuel with a small quantity of the ignition improver. Ignition improvers, e.g., substances which enhance cetane number of a quantity of fuel, include materials such as di-t-butylperoxide, methylhydroperoxide, heptylhydroperoxide, octylhydroperoxide, 2-ethylhexylnitrate, and other peroxide, hydroperoxide, alkyl nitrate, or acetylene. Thus, oxygenated hydrocarbon species can be created in the engine exhaust by injection of a mixture of the fuel and the ignition improver into the exhaust. Injection of this mixture results in low-temperature oxidation reactions that produce the active species. The mixture of 98% n-heptane and 2% di-t-butylperoxide or isooctyl hydroperoxide can reduce the temperature at which significant quantities of acetaldehyde and other oxygenates are produced by about 40-50° C. than that required in the absence of the added peroxide or hydroperoxide. This allows a significant reduction in the exhaust temperature required to achieve high $NO_x$ conversions in HC-SCR compared to that obtained with injection of fuel without the ignition improver. Hydroperoxides and peroxides can be produced from either gasoline or diesel fuel by autoxidation on-board the vehicle. This method allows the minimum amount of time between on-board production and use of these unstable compounds. Alternatively, a small reservoir of the required compounds, mixed with the engine fuel if desired, can be filled at the factory or at a service station. Assuming a usage level of 1.8 g/mile of fuel injected into the exhaust for HC-SCR, and an average molecular weight of 110 g/mole for gasoline, a 2% molar concentration of iso-octyl-hydroperoxide requires 32.7 moles of the hydroperoxide over 100,000 miles of operation, corresponding to about 4.8 kg of hydroperoxide. A third alternative is to use engine fuel which already contains the desired amount of additive.

The active species generated in the exhaust act as the reductant for conversion of nitrogen oxides to molecular nitrogen in the HC-SCR device at catalyst temperatures as low as 200 to 250° C. At this catalyst temperature, diesel fuel itself, when injected into the exhaust upstream of the HC-SCR catalyst, is less effective as a reductant in HC-SCR. This invention facilitates efficient selective $NO_x$ reduction to occur over a wide range of exhaust temperatures, and hence a wide range of speed and load conditions. The benefits of such operation include improved performance (higher NOx conversion) across the HC-SCR at low exhaust temperatures, and potential to reduce volume, mass, and cost of the exhaust aftertreatment devices.

In operation, the control module controls the injector device to inject a quantity of the blend of fuel and ignition improver into the exhaust gas upstream of the hydrocarbon-selective catalytic reduction catalyst. The second injector device 14 and flow control valve 21 are actuated to inject a quantity of the blended fuel and ignition improver into the exhaust gas when temperature of the exhaust gas at the location of the injection is greater than about 280° C., preferably according to the following scheme. When the temperature is about 280° C., the injected blend comprises the fuel, with no flow of the ignition improver. With increasing temperature, the flow control valve is actuated, to control flow of the ignition improver so that the blend comprises a mixture about 2% ignition improver and the remaining amount comprising fuel when temperature is between about 280° C. and 400° C. In the temperature range 280° C. to 350° C. there is little reaction of the ignition improver and diesel fuel in the exhaust stream. However, the ignition improver may increase to some degree the rate of hydrocarbon oxidation leading to hydrocarbon activation over the SCR catalyst, compared to this rate with diesel fuel alone, thus providing an increase in conversion efficiency over the HC-SCR catalyst With further increasing temperature, actuation of the flow control valve 21 is controlled preferably in a linear fashion, until when the temperature of the exhaust gas is greater than about 430° C., the injected blend comprises the fuel with substantially no ignition improver flowing. The quantity of the blended fuel and ignition improver injected into the exhaust gas is determined based upon engine operating conditions and a space velocity of the hydrocarbon-selective catalytic reduction device to achieve effective $NO_x$ reduction therethrough.

Injection of the mixture of fuel and ignition improver in the range of temperatures from about 350° C. to 430° C. at the start of the injection leads to partial oxidation reactions of the fuel, thus generating the active or oxygenated species. This range may be extended to lower temperature with the appropriate choice of ignition improver and its concentration blended in the diesel fuel. The partial oxidation product of the fuel, including the active species, acts as a reductant which reacts with the exhaust gas across the HC-SCR device to reduce the $NO_x$ emissions therein, over a wide range of temperatures. Injecting the fuel in the range of temperatures from 350° C. to 430° C. produces oxygenates and other particularly active species for hydrocarbon selective catalytic oxidation (HC-SCR) of engine-out $NO_x$ species in the exhaust gas feedstream. The active species include, but are not limited to, oxygenates such as ethanol, formaldehyde, acetaldehyde; and straight-chain olefins such as 1-butene and 1-octene. The preferred fuel can be any convenient hydrocarbon fuel, including but not limited to gasoline or diesel fuel.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. An exhaust gas purifying system, comprising:
   a hydrocarbon-selective catalytic reduction device configured to treat exhaust gas flowing from an internal combustion engine;
   an injector device configured to inject a blend of fuel and an ignition improver comprising a cetane enhancer into the exhaust gas at a location upstream of the hydrocarbon-selective catalytic reduction catalyst; and,
   a control module configured to control the injector device to inject a quantity of the blended fuel and ignition improver comprising the cetane enhancer into the exhaust gas when temperature of the exhaust gas at the location of the injection is greater than about 280° C.

2. The exhaust gas purifying system of claim 1, wherein the hydrocarbon-selective catalytic reduction device comprises a silver-alumina catalyst.

3. The exhaust gas purifying system of claim 1, wherein the hydrocarbon-selective catalytic reduction device comprises one of a barium-yttria zeolite catalyst, and, a sodium-yttria zeolite catalyst.

4. The exhaust gas purifying system of claim 1, wherein the injector device further comprises: a device configured to deliver a quantity of the blend of fuel and ignition improver comprising the cetane enhancer, comprising a device for transporting fuel from a fuel tank of the vehicle to the injector device, and, a flow control device for metering the ignition improver comprising the cetane enhancer into the fuel from a storage device.

5. The exhaust gas purifying system of claim 4, wherein the quantity of the blended fuel and ignition improver comprising the cetane enhancer injected into the exhaust gas is determined based upon engine operating conditions and a space velocity of the hydrocarbon-selective catalytic reduction device.

6. An exhaust gas purifying system, comprising:
a hydrocarbon-selective catalytic reduction device configured to treat exhaust gas flowing from an internal combustion engine;
an injector device configured to inject a blend of fuel and an ignition improver into the exhaust gas at a location upstream of the hydrocarbon-selective catalytic reduction catalyst;
a control module configured to control the injector device to inject a quantity of the blended fuel and ignition improver into the exhaust gas when temperature of the exhaust gas at the location of the injection is greater than about 280° C.; wherein:
the blend comprises the fuel, when temperature of the exhaust gas at the location of the injection is less than about 280° C.;
the blend comprises a mixture comprising about 2% ignition improver and the remaining amount comprising fuel, when temperature of the exhaust gas at the location of the injection is between about 280° C. and 400° C., and,
the blend comprises the fuel, when temperature of the exhaust gas at the location of the injection is greater than about 430° C.

7. The exhaust gas purifying system of claim 6, wherein the ignition improver comprises one of a peroxide, hydroperoxide, alkyl nitrate, and, acetylene.

8. The exhaust gas purifying system of claim 7, wherein the peroxide comprises di-t-butylperoxide; the hydroperoxide comprises methylhydroperoxide, heptylhydroperoxide, and octylhydroperoxide; and the alkyl nitrate comprises 2-ethylhexylnitrate.

9. The exhaust gas purifying system of claim 6, wherein the injected blend of fuel and ignition improver generates a reductant comprising a partial oxidation product of the fuel including an active species.

10. The exhaust gas purifying system of claim 1, further comprising an oxidation catalytic device upstream of the hydrocarbon-selective catalytic reduction device and the injector device.

11. The apparatus of claim 1, wherein the internal combustion engine comprises a lean-burn compression-ignition engine.

12. The exhaust gas purifying system of claim 1, wherein the internal combustion engine comprises a spark-ignited lean-burn engine.

13. Apparatus, comprising:
an exhaust aftertreatment system fluidly connected to and configured to treat exhaust gas flowing from an internal combustion engine operable at an air/fuel ratio that is lean of stoichiometry, comprising: an oxidation catalytic device upstream of and fluidly connected to a hydrocarbon-selective catalytic reduction device;
an injector device configured to inject a blend of fuel and an ignition improver comprising a cetane enhancer into the exhaust gas at a location between the oxidation catalyst and the hydrocarbon-selective catalytic reduction catalyst, the blend of fuel and ignition improver comprising the cetane enhancer based upon temperature of the exhaust gas at the location of the injection; and,
a control module configured to control the injector device to inject the blended fuel and ignition improver comprising the cetane enhancer into the exhaust gas when temperature of the exhaust gas at the location of the injection is greater than 280° C.

14. The apparatus of claim 13, wherein the injected blend of fuel and ignition improver comprising the cetane enhancer generates a reductant comprising a partial oxidation product of the fuel including an active species upstream of the hydrocarbon-selective catalytic reduction device.

15. Method for reducing $NO_x$ emissions in exhaust gas of a lean-operating internal combustion engine during ongoing operation, comprising: injecting a blend of fuel and an ignition improver comprising a cetane enhancer into the exhaust gas upstream of a hydrocarbon-selective catalytic reduction device when temperature of the exhaust gas at a location of the injection is greater than about 280° C.

16. The method of claim 15, wherein injecting the blend of fuel and the ignition improver comprising the cetane enhancer into the exhaust gas further comprises the blend of fuel and ignition improver comprising about 2% cetane enhancer and the remaining amount comprising fuel when temperature of the exhaust gas at the location of the injection is between about 280° C. and 400° C.

17. The method of claim 16, wherein injecting the blend of fuel and the ignition improver comprising the cetane enhancer into the exhaust gas further comprises: injecting fuel with no ignition improver when temperature of the exhaust gas at the location of the injection is greater than about 430° C.

18. The method of claim 15, further comprising:
determining a mass flowrate of $NO_x$ emissions based upon engine operating conditions; and,
controlling a mass flowrate of the injected blend of fuel and the ignition improver comprising the cetane enhancer to reduce the mass flow rate of $NO_x$ emissions across the hydrocarbon-selective catalytic reduction catalyst based upon a space velocity of the hydrocarbon-selective catalytic reduction device.

* * * * *